US010649726B2

(12) United States Patent
Kalisky et al.

(10) Patent No.: US 10,649,726 B2
(45) Date of Patent: May 12, 2020

(54) NAVIGATION AND ORIENTATION TOOLS FOR SPEECH SYNTHESIS

(71) Applicants: Dror Kalisky, Raanana (IL); Sharon Carmel, Givatayim (IL)

(72) Inventors: Dror Kalisky, Raanana (IL); Sharon Carmel, Givatayim (IL)

(*) Notice: Subject to any disclaimer, the term of this patent is extended or adjusted under 35 U.S.C. 154(b) by 0 days.

(21) Appl. No.: 15/678,615

(22) Filed: Aug. 16, 2017

(65) Prior Publication Data
US 2018/0032309 A1  Feb. 1, 2018

Related U.S. Application Data

(63) Continuation of application No. 13/012,989, filed on Jan. 25, 2011, now abandoned.

(60) Provisional application No. 61/347,575, filed on May 24, 2010, provisional application No. 61/297,921, filed on Jan. 25, 2010.

(51) Int. Cl.
*G06F 3/0488* (2013.01)
*G10L 13/00* (2006.01)
*G10L 13/04* (2013.01)
*G10L 13/027* (2013.01)
*G09B 5/06* (2006.01)
*G06F 3/16* (2006.01)

(52) U.S. Cl.
CPC .......... *G06F 3/167* (2013.01); *G06F 3/04883* (2013.01); *G10L 13/00* (2013.01); *G10L 13/043* (2013.01); *G09B 5/062* (2013.01); *G10L 13/027* (2013.01)

(58) Field of Classification Search
CPC ..... G10L 13/027; G10L 13/08; G10L 13/043; G09B 5/062; G06F 3/04883

USPC .................. 704/258, 260, 267, 270; 434/167
See application file for complete search history.

(56) References Cited

U.S. PATENT DOCUMENTS 5,463,725 A    10/1995 Henckel et al. ............... 715/776
5,657,426 A *  8/1997 Waters ..................... G10L 15/24
                                                704/270
5,697,793 A    12/1997 Huffman et al. ............. 434/317
(Continued)

OTHER PUBLICATIONS

Keller, et al. "A serial prediction component for speech timing." Speech and Signals. Aspects of Speech Synthesis and Automatic Speech Recognition, 2000, pp. 41-49.
(Continued)

Primary Examiner — James S Wozniak
(74) Attorney, Agent, or Firm — Browdy and Neimark, PLLC

(57) ABSTRACT

TTS is a well known technology for decades used for various applications from Artificial Call centers attendants to PC software that allows people with visual impairments or reading disabilities to listen to written works on a home computer. However to date TTS is not widely adopted for PC and Mobile users for daily reading tasks such as reading emails, reading pdf and word documents, reading through website content, and for reading books. The present invention offers new user experience for operating TTS for day to day usage. More specifically this invention describes a synchronization technique for following text being read by TTS engines and specific interfaces for touch pads, touch and multi touch screens. Nevertheless this invention also describes usage of other input methods such as touchpad, mouse, and keyboard.

17 Claims, 14 Drawing Sheets

(56) References Cited

U.S. PATENT DOCUMENTS

| | | | |
|---|---|---|---|
| 5,893,132 A | 4/1999 | Huffman et al. | 715/201 |
| 6,115,482 A | 9/2000 | Sears et al. | 382/114 |
| 6,871,107 B1 | 3/2005 | Townsend et al. | 700/94 |
| 7,174,295 B1 | 2/2007 | Kivimaki | 704/260 |
| 7,974,715 B2 | 7/2011 | Townsend et al. | 700/94 |
| 8,103,554 B2 | 1/2012 | Tom | 705/26.1 |
| 8,793,575 B1 | 7/2014 | Lattyak et al. | 715/273 |
| 2002/0019950 A1 | 2/2002 | Huffman et al. | 713/300 |
| 2002/0099552 A1 | 7/2002 | Rubin et al. | 704/270 |
| 2002/0133349 A1 | 9/2002 | Barile | G11B 27/34 |
| | | | 704/265 |
| 2003/0014674 A1 | 1/2003 | Huffman et al. | 713/300 |
| 2003/0229494 A1 | 12/2003 | Rutten | G10L 13/06 |
| | | | 704/254 |
| 2004/0107102 A1* | 6/2004 | Chung | G10L 13/10 |
| | | | 704/260 |
| 2005/0119888 A1* | 6/2005 | Sakai | G06F 3/0481 |
| | | | 704/258 |
| 2006/0224386 A1* | 10/2006 | Ikegami | G10L 13/00 |
| | | | 704/260 |
| 2007/0083828 A1 | 4/2007 | Toriyama et al. | 715/816 |
| 2007/0168852 A1* | 7/2007 | Erol | G06F 17/30044 |
| | | | 715/234 |
| 2008/0086303 A1 | 4/2008 | Sengamedu | 704/231 |
| 2008/0122796 A1 | 5/2008 | Jobs | G06F 3/0488 |
| | | | 345/173 |
| 2008/0168349 A1 | 7/2008 | Lamiraux | G06F 3/0482 |
| | | | 715/702 |
| 2008/0228590 A1 | 9/2008 | Johnson | 705/26 |
| 2008/0235276 A1* | 9/2008 | Erol | G10L 13/00 |
| 2008/0235585 A1* | 9/2008 | Hart | G06F 17/30058 |
| | | | 715/717 |
| 2008/0256479 A1 | 10/2008 | Hemmings | 715/776 |
| 2008/0292272 A1* | 11/2008 | Yamazaki | H04N 5/44513 |
| | | | 386/244 |
| 2009/0202226 A1 | 8/2009 | McKay | 386/104 |
| 2009/0239202 A1 | 9/2009 | Stone | 434/178 |
| 2009/0319265 A1 | 12/2009 | Wittenstein | G10L 21/04 |
| | | | 704/234 |
| 2010/0274838 A1* | 10/2010 | Zemer | G10L 13/00 |
| | | | 709/203 |
| 2010/0324902 A1 | 12/2010 | Kurzweil et al. | 704/260 |
| 2010/0324905 A1 | 12/2010 | Kurzweil et al. | 704/260 |
| 2011/0050594 A1 | 3/2011 | Kim et al. | 345/173 |
| 2011/0153047 A1 | 6/2011 | Cameron et al. | 700/94 |
| 2011/0208614 A1 | 8/2011 | Tom | 705/27.1 |
| 2011/0288861 A1 | 11/2011 | Kurzweil et al. | 704/235 |
| 2012/0046947 A1 | 2/2012 | Fleizach | 704/260 |
| 2012/0143600 A1* | 6/2012 | Iriyama | G10L 13/08 |
| | | | 704/207 |
| 2012/0245720 A1 | 9/2012 | Story, Jr. | G06F 3/04842 |
| | | | 700/94 |
| 2012/0311438 A1 | 12/2012 | Cranfill et al. | 715/256 |
| 2018/0032309 A1* | 2/2018 | Kalisky | G10L 13/00 |

OTHER PUBLICATIONS

"Speech Synthesis", Retrieved on Jan. 9, 2011 at <<http://en.wikipedia.org/w/index.php?title=Speech_synthesis&oldid=339175220>>, pp. 1-12.

* cited by examiner

NAVIGATION AND ORIENTATION TOOLS FOR SPEECH SYNTHESIS

REFERENCE TO CO-PENDING APPLICATIONS

Priority is claimed from U.S. provisional application No. 61/297,921 entitled "Navigation and orientation tools for speech synthesis" filed 25 Jan. 2010 and from U.S. Patent Application No. 61/347,575 entitled "Navigation and orientation tools for speech synthesis" filed 24 May 2010.

FIELD OF THE INVENTION

The present invention is in the field of navigation and orientation tools for speech synthesis.

BACKGROUND OF THE INVENTION

According to Wikipedia: Speech synthesis is the artificial production of human speech. A computer system used for this purpose is called a speech synthesizer, and can be implemented in software or hardware. A text-to-speech (TTS) system converts normal language text into speech; other systems render symbolic linguistic representations like phonetic transcriptions into speech.

Since invented, speech technology constantly improved it's abilities. Most efforts where around imitating a human voice and fluently reading while the user interface and text navigating abandoned. From the user point of view, it is still complicated to use since current common user interfaces are limited, for example:

The existing products/applications are far from being comfortable for the end users.
 a. In most cases, the user needs to select, by marking the text before listening to it.
 b. If the user stops in the middle of reading, playing text again will start from the beginning of the marked text.
 c. During reading there are no text pointers and the users lost their orientation very quickly.
 d. Not using device specific input methods and apparatuses such as touchpad's, touch and multitouch screens making navigation easier and more intuitive.
 e. reading large amounts of content are almost impossible.
 f. Current audio books navigation is cumbersome There is a need in the art to provide new controls for text to speech navigation and reading orientation by adding new orientation abilities that will enable easy navigation through large documents, and will help readers to follow the text as it is being read by the TTS engine.

There is a need in the art to provide a solution that will work on any device Mac/PC, Mobile Smartphone or Tablets by touch, voice, mouse or keyboard.

According to Wikipedia: A text-to-speech (TTS) system (or "engine") is composed of two parts: a front-end and a back-end. The front-end has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words is called text-to-phoneme or grapheme-to-phoneme conversion. Phonetic transcriptions and prosody information together make up the symbolic linguistic representation that is output by the front-end. The back-end—often referred to as the synthesizer—then converts the symbolic linguistic representation into sound.

In one embodiment of the present invention the engine will provide portrayed text indications every time a new sentence or a new word or a new character collectively referred hereunder as the "text" is being output by the back-end. Based on these indications the system will mark for example but not limited to portraying a magnifying glass over text being read, providing the user with orientation of the current text being read.

In a second embodiment of the present invention the engine will provide portrayed line indications every time the text being read, where that text is the next line or in the previous line relatively to the text that was read immediately before the current text. A line indication can be for example portraying a small needle at the beginning of the line that is currently being read.

In a third embodiment of the present invention the user may click, double click, drag, use a single touch or a multitouch gesture applied on over the portrayed text indicator in order to start or stop playback of the TTS engine.

In a fourth embodiment of the present invention the user may drag, use a single touch or a multitouch gesture applied on the portrayed text indicator in order to set a new reading point for playback of the TTS engine.

In a fifth embodiment of the present invention the user may drag, use a single touch or a multitouch gesture applied on the portrayed text indicator in order to set a new reading point for playback of the TTS engine. Where said reading point is not in the same page of the book.

SUMMARY OF THE INVENTION

In accordance with an aspect of the invention, there is provided a method for outputting a text, comprising
 a. indicating read text on a screen by using a portrayed text indicator, for example portraying a magnifying glass on the read text;
 b. synchronizing the read text and audio playback of the indicated text.

In accordance with an embodiment of the invention, there is provided a method, wherein the synchronization is at word boundary.

In accordance with an embodiment of the invention, there is further provided a method, wherein the synchronization is at sentence boundary.

In accordance with an embodiment of the invention, there is still further provided a method, further comprising providing a scroll indicator for scrolling the text by a user dragging the scroll indicator.

In accordance with an embodiment of the invention, there is still further provided a method, further comprising providing a page flipping indicator for flipping page by means of a user swipe gesture on the flipping indicator.

In accordance with an embodiment of the invention, there is still further provided a method, further comprising displaying the text in a screen layout that portrays a text book.

In accordance with an embodiment of the invention, there is still further provided a method further comprising removing text controls when portraying flipping of a page in the text book.

In accordance with an embodiment of the invention, there is still further provided a method configured to operate on the IPAD™, IPAD™, IPOD™, IPHONE™, Android™.

In accordance with an aspect of the invention, there is provided a method for outputting a text, comprising:

indicating read text on a touch screen by portraying a text indicator on the read text;

applying a swipe gesture by a user touch on the text indicator to start or stop reading the text synchronizing the read text and audio playback of the indicated text.

In accordance with an embodiment of the invention, there is provided a method, wherein the direction of the swipe gesture prescribes the start or stop playback, respectively.

In accordance with an aspect of the invention, there is provided a method for outputting a text, comprising:

indicating read text on a touch screen by portraying a text indicator on the read text;

dragging the text indicator by a user touch to a different location in the text;

synchronizing the read text starting from the new position and audio playback of the indicated text.

In accordance with an embodiment of the invention, there is provided a method, further comprising changing the position of a time indicator to reflect the text that already been processed up to the new position, wherein the time indicator indicating on the proportion of the text that has already been processed compared to the entire text passage for reading.

In accordance with an embodiment of the invention, there is provided a method comprising:

indicating read text on a touch screen by portraying a text indicator on the read text;

calculating the entire reading time of a text by being proportionally to multiplying the average time required to read a character by the total characters in the text;

portraying a time indicator to reflect the text that already been processed up to the new position, wherein the time indicator indicating on the proportion of the text that has already been processed compared to said calculated entire reading time.

In accordance with an embodiment of the invention, there is provided a method, wherein the average time required to read a character is configurable according to the a desired text playback rate.

In accordance with certain other aspects of the invention there are provided counterpart system configurations configured to perform the specified method steps.

DESCRIPTION OF DRAWINGS

In order to understand the invention and to see how it may be carried out in practice, embodiments will now be described, by way of non-limiting example only, with reference to the accompanying drawings, in which:

FIGS. 3a, 3b, 3c, and 3d are screen layouts of a text and associated controls in accordance with certain embodiments of the invention FIGS. 5a and 5b are screen layouts of displayed controls in accordance with certain embodiments of the invention FIGS. 6a, 6b, 6c, 6d, and 6e are screen layouts of displayed controls in accordance with certain embodiments of the invention FIGS. 7a and 7b are screen layouts of a text and associated controls in accordance with certain embodiments of the invention

The subject matter of the present application can have features of different aspects described above, or their equivalents, in any combination thereof, which can also be combined with any feature/s of the subject matter described in the detailed description of embodiments presented below, or their equivalents.

DETAILED DESCRIPTION OF THE INVENTION

The current invention describes a system and methods for users that need to read text from a display. This system is useful for mobile users that would like the computer to read the text for them since they are in constant movement, say walking, driving, on a train, were they often need to move their eyes from the display and therefore lose the last point they read in the text, making it impossible to have a continuous experience. Also when reading large text even when stationary there is a need for a pointer, instead of using the finger or the mouse, the system is reading the text for the user and the current word and line text is being highlighted keeping the listener with visual orientation to the text being read. It seems that readers that are reading through text that it not written in their mother tongue or readers that are not highly skilled in reading for example kids in kindergarten and kids during their first years as students find it hard to pronounce some of the words and generally reading slower than usual will find the TTS system with Navigation and Orientation tools detailed hereunder the user reads through the text faster, and easier while also expending his language skills.

Figure 2A:
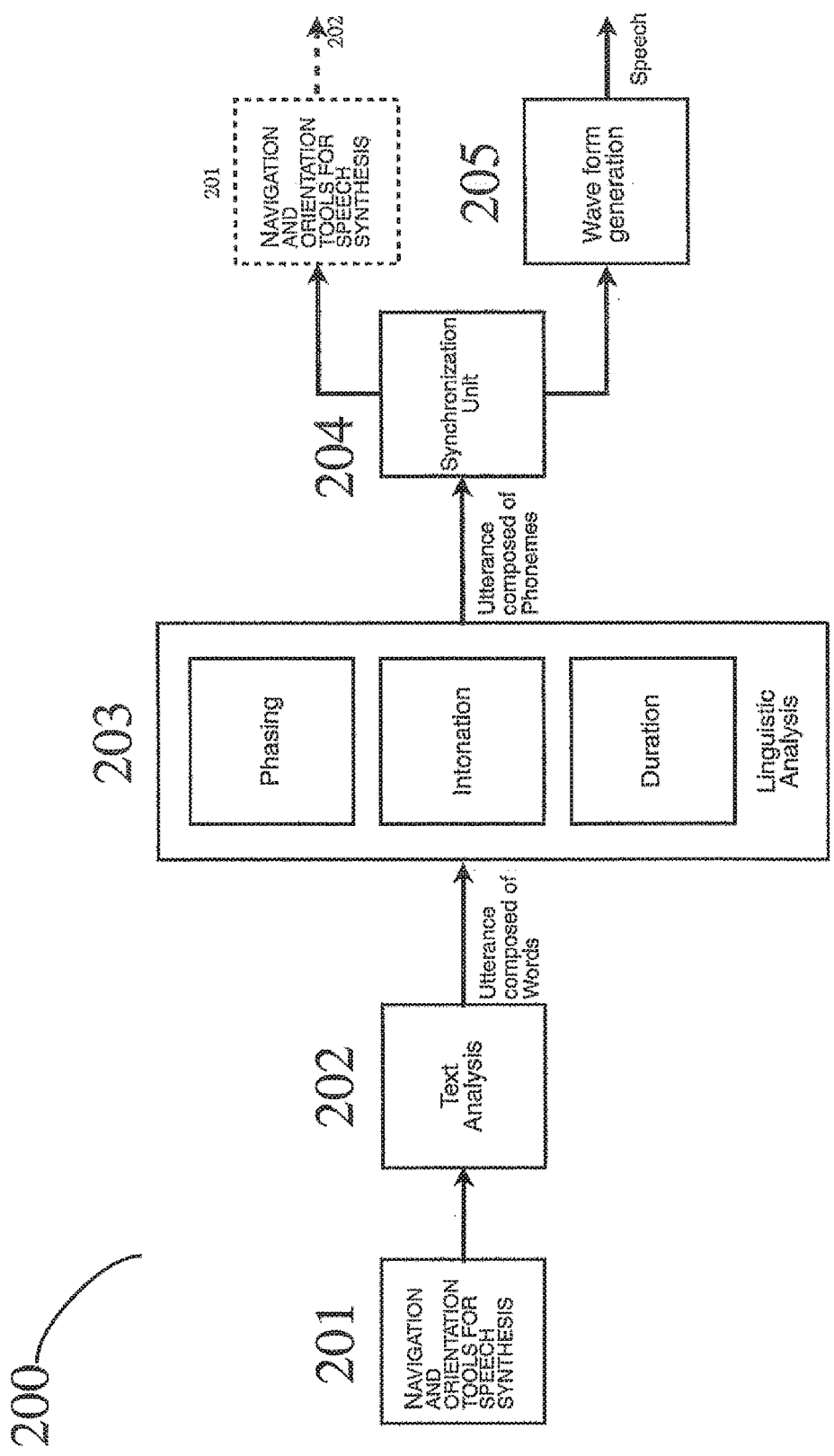
FIG. 2a illustrates a system architecture in accordance with certain embodiments of the invention
Figure 2B:
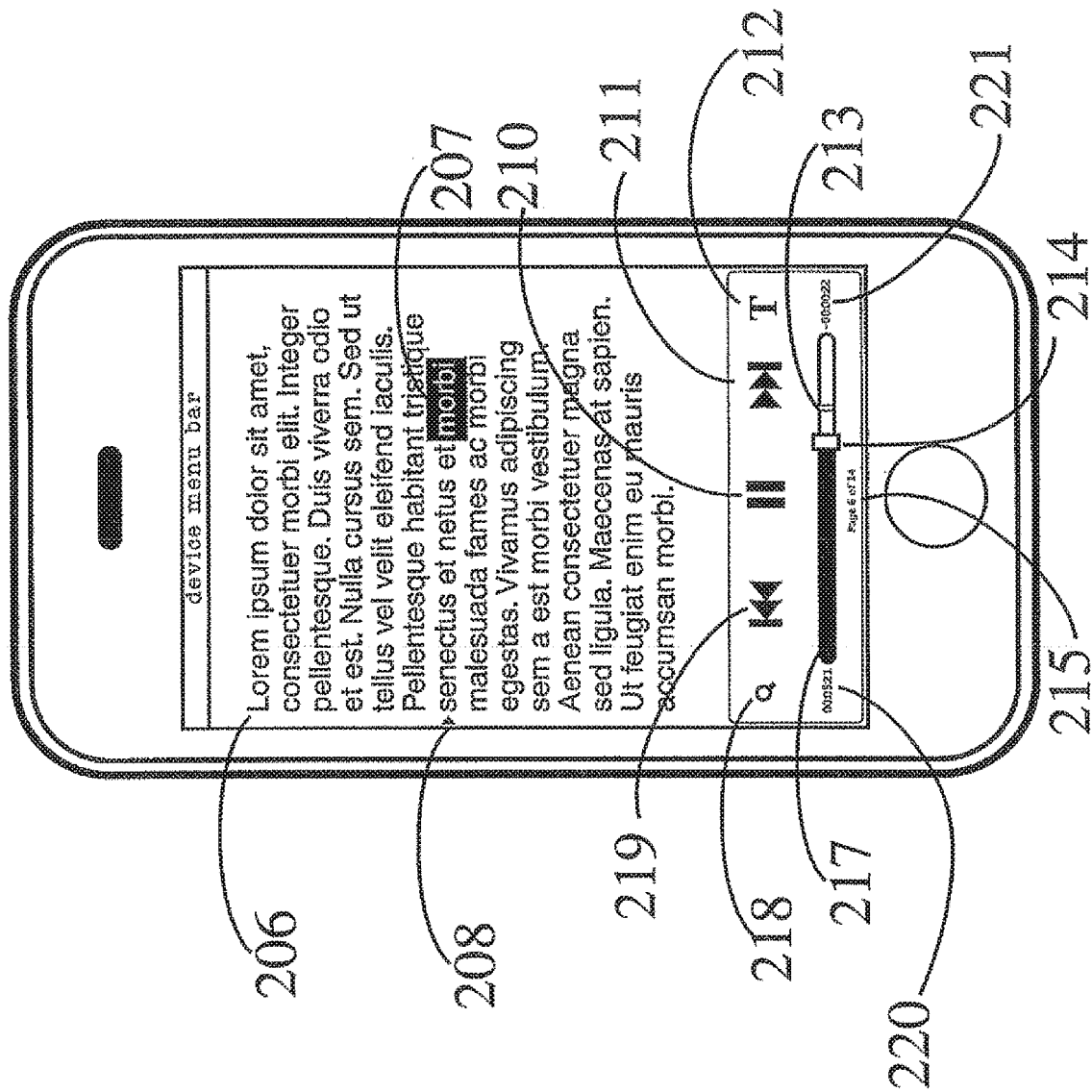
FIG. 2b is a screen layout of a text and associated controls in accordance with certain embodiments of the invention

According to FIG. 2a the system includes portrayed text indicators, in this case a word indicator 207 and a portrayed line indicator 208. These indicators help the user to immediately focus on the text and keep the user in context of the text being read. The portrayed word indicator 207 changes to the next word as the TTS engine progress through the text. The text will scroll to be aligned with the portrayed line indicator when a new line is going to start being read by the TTS engine. In this case since the line indicator is in a fixed place on the screen the user knows exactly were to look for the text on the display. The control button has navigation buttons 219 and 211 helping the user to move forward and backward in the text.

The Timeline 217 represents the duration it will take reading through the entire text, the knob 214 represent the current time of the text being read. For each word that is being read by the TTS engine the system is generating 1) A portray indicating the word being read 207, 2) portray indicating the line of the word being read 208 and, 3) Time indication by moving the knob 214 to the respective point in time of that word in the entire reading sequence. Also the time elapsed 220, time remaining 221, and page number 215 is updated accordingly.

The user can at any time see the current time in the reading 220 and the reading time 221 to complete the reading of the text. These indications are imperative for the user to understand where he is in the process of reading and how much time remained for the reading, and plan his time accordingly. Additionally the timeline has a knob 214 that represents the current time of the text being read, that knob 214 is moving along the timeline as the reading progresses, giving the user the feeling of continuity and that he is in progress while listening to the text, the progress bar gives the user further indication of the pace the text is being read and since progress is captured by the mind as something positive, it actually encourages the user to keep on listening to the text and complete the task of listening to the entire text. The knob 214 is also used for navigation by scrolling the knob 214 along the time line the user can access any point in the text. When scrolling the knob the text in the display area 206 is moved accordingly keeping sync with the knob 214.

The system may be operated in different ways, in some embodiments of the present invention the system maybe a generic capability of the device system (also known as a system service, drive, resident, etc.) where the user can use the system to read for example: his emails, word documents, pdf files and webpage's for the user and the system will read the text for the user including the highlight of the words, lines, timeline and control buttons within his application. In another embodiment of the present invention the system is implemented as an application where the user paste clips of at least text copied for example from his emails, word documents, pdf files and webpage's and then ask the application to read through the text using the highlight of the words, lines, timeline and control buttons.

Note that the description above was provided for understanding the need and typical use of the system of the invention. The invention is by no means bound by this exemplary description which is provided for illustrative purposes only.

Figure 1:
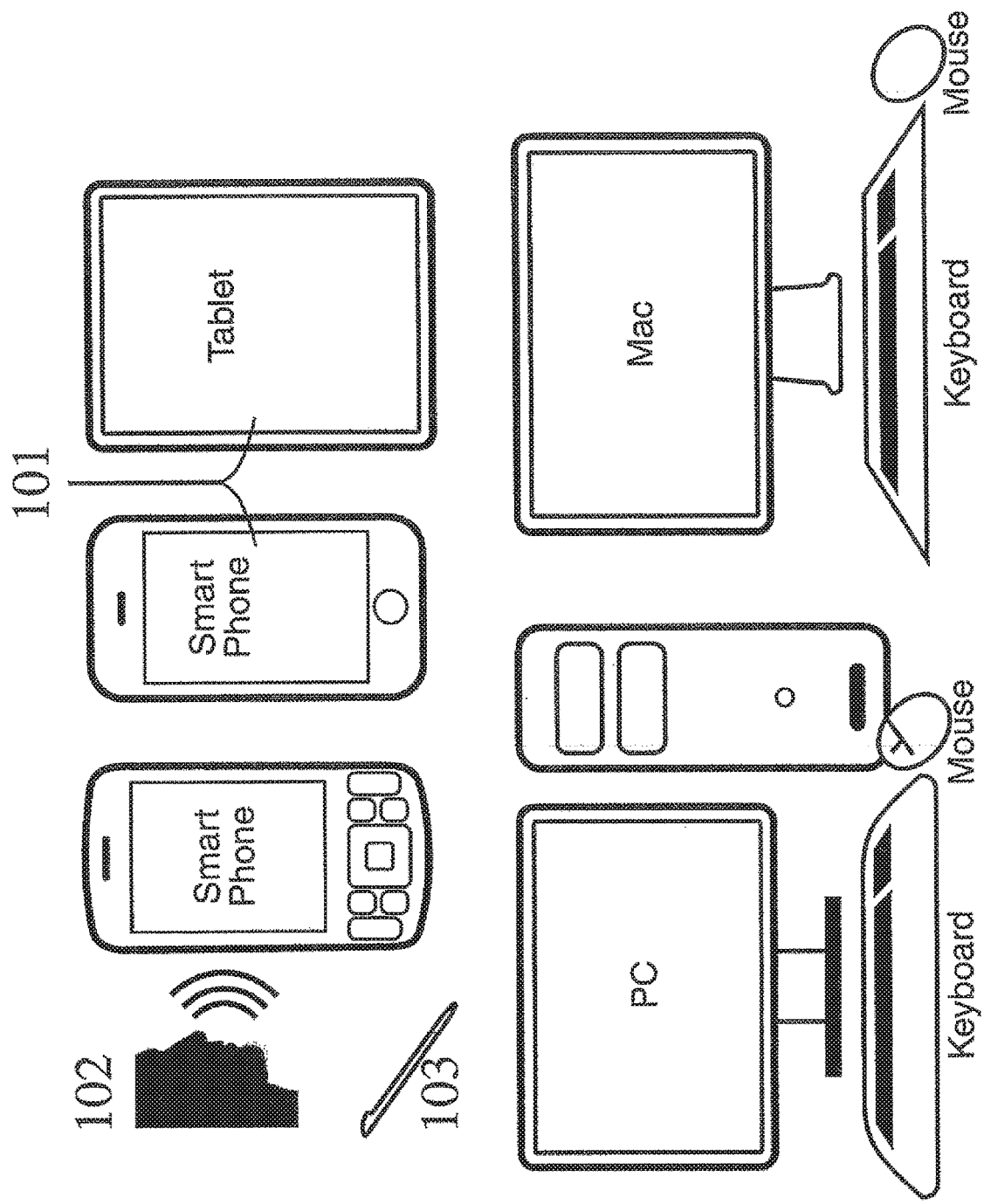
FIG. 1 illustrates platforms that can be used in a system in accordance with certain embodiments of the invention

Bearing this in mind, attention is drawn to FIG. 1 which demonstrates a NAVIGATION AND ORIENTATION TOOLS FOR SPEECH SYNTHESIS implemented on a PC, MAC, Tablet, and Smart phone. The mouse, keyboard, touch screen, touch gestures 101, stylus 103 and voice activated 102 are examples of input devices enabling pointing and selecting referred here under as "selection", "selections", "selected", "selects", etc. Where a mouse, keyboard, touch screen, touch gestures 101, stylus 103 and voice activated 102 are examples of input devices that enables text scrolling referred hereunder as "scroll", "scrolls", "scrolling", etc. When selecting controls on the screen buttons or menus will be refereed collectively herein as "buttons". Such buttons can be operated by touch screen, touch gestures 101, stylus 103, mouse, keyboard, and voice control 102.

FIG. 2a shows a text-to-speech (TTS) system (or "engine") is composed of two parts: a front-end 202 and 203 and a back-end 205. The front-end 202 has two major tasks. First, it converts raw text containing symbols like numbers and abbreviations into the equivalent of written-out words. This process is often called text normalization, pre-processing, or tokenization. The front-end then assigns phonetic transcriptions to each word, and divides and marks the text into prosodic units, like phrases, clauses, and sentences. The process of assigning phonetic transcriptions to words 203 is called text-to-phoneme or grapheme-to-phoneme conversion. Phonetic transcriptions and prosody information together make up the symbolic linguistic representation that is output by the front-end 203. The back-end 205—often referred to as the synthesizer—then converts the symbolic linguistic representation into sound.

The present invention also has a Navigation and Orientation Unit 201 and Synchronization Unit 204. The Synchronization unit 204 is responsible for taking the output of the front-end 203 and feed it synchronically to the Wave Form Generation 205 and the Navigation and Orientation Unit 201. In one embodiment of the present invention the Synchronization unit 204 may Synchronize the Wave Form Generation 205 and the Navigation and Orientation Unit 201 for every new word. In another embodiment of the present invention the Synchronization Unit 204 may Synchronize the Wave Form Generation 205 and the Navigation and Orientation Unit 201 for every character, line, sentence, paragraph, bookmark, or page. In another embodiment of the present invention the Synchronization Unit 204 may Synchronize the Wave Form Generation 205 and the Navigation and Orientation Unit 201 for every segment of the text as defined by the application. Synchronization is achieved for example, in the case were the Synchronization Unit 204 synchronizes for every word, by having the Synchronization Unit 204 waiting for the word to be played by the Wave Form Generation 205, and only then continue to the next word if such word exists. By waiting for the word to be played the system achieve synchronization.

The Navigation and Orientation Unit 201 has Human Interface—UI, that enables the user to interact with the displayed text and other UI parts such as buttons. In one embodiment of the present invention the user may start a TTS session by ordering the Text Analysis Unit 202 to start reading text by selecting a "Play" button. In another embodiment of the present inventions the user interacts with the Navigation and Orientation Unit 201 UI, the Navigation and Orientation Unit 201 may change the text feed to the Text Analysis Unit 202 and start a new TTS session.

Figure 3A:
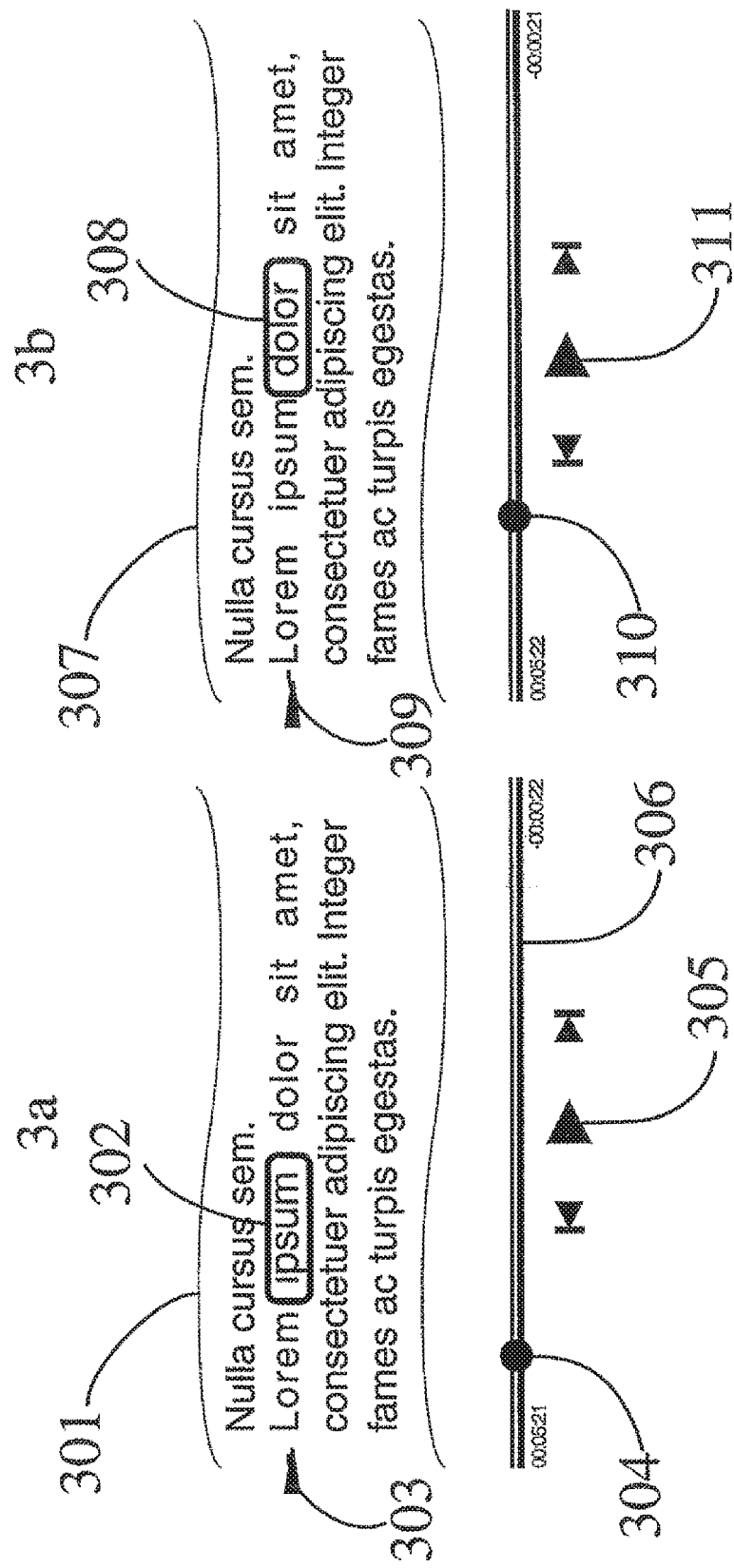
Figure 3C:
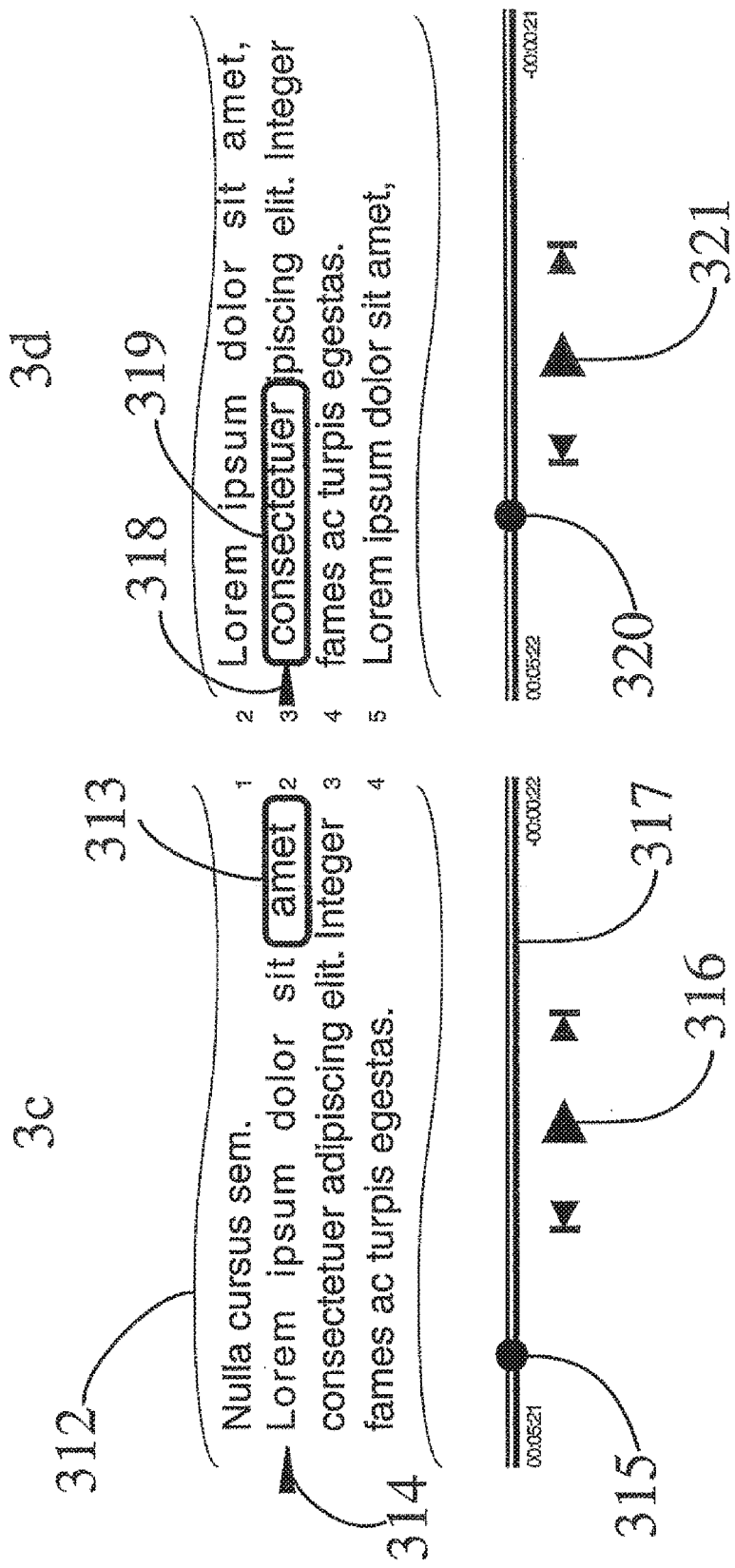

FIGS. 3a-d show a portrayed text indicator 302 that is portrayed on the text 301 with as a magnifying glass effect. The magnifying glass 302 surrounds at least one character in the text 301. In a preferred embodiment of the present invention the magnifying glass 302 surrounds at least one word. In another embodiment of the present invention the magnifying glass 302 is aligned to the direction of the text reading, for example when TTS Engine is reading English the magnifying glass 302 will be aligned to the left of the word that is currently being read. In yet another preferred embodiment of the present invention the magnifying glass 302 will not jump from word to word but rather will animate from its position on word 302 to its new position on word 308, giving the user a progressive experience. By animating the magnifying glass 302 the user feels like the text is being followed with a finger in continuous motion. In another embodiment of the present invention the when the magnifying glass 313 moves from its current line FIG. 3c line 2 to a new line FIG. 3d line 3, it will animate from the last word of the line 313 to the beginning of the first word in the next line 319. FIG. 3c and FIG. 3d further show a line indicator 314 and 318 portrayed as a triangle. In a preferred embodiment of the present invention the line indicator 314 looks like a needle that points to the current line. In yet another preferred embodiment of the present invention the line indicator 314 will animate when moving from line FIG. 3c line 2 to line FIG. 3d line 3.

In one embodiment of the present invention the portrayed text indicator animation, in this case the portrayed magnifying glass over words 302 and 308, will start when the synchronization unit 204 will send "word is about to start" event to the Navigation and orientation tool unit 201. The "word is about to start" event is fired immediately after the waveform generator 205 completed synthesizing the current word 302. The time between the "word is about to start" event and the time the waveform generator will start synthesizing the next word 308 is the time duration for the magnifying glass to animate between the current word 302 to the next word 308. For example in case the time gap in between words is 200 ms, the time gap between the "word is about to start" event and actual speech synthesis of that word will be 200 ms, and that would also be the time for the magnifying glass to animate from word 302 to word 308. In another embodiment of the present invention during the time gap between the "word is about to start" event and actual speech synthesis of that word the word indicator and the line indicator will animate from their current position 313, 314 to their new position 318, 319.

Figure 4:
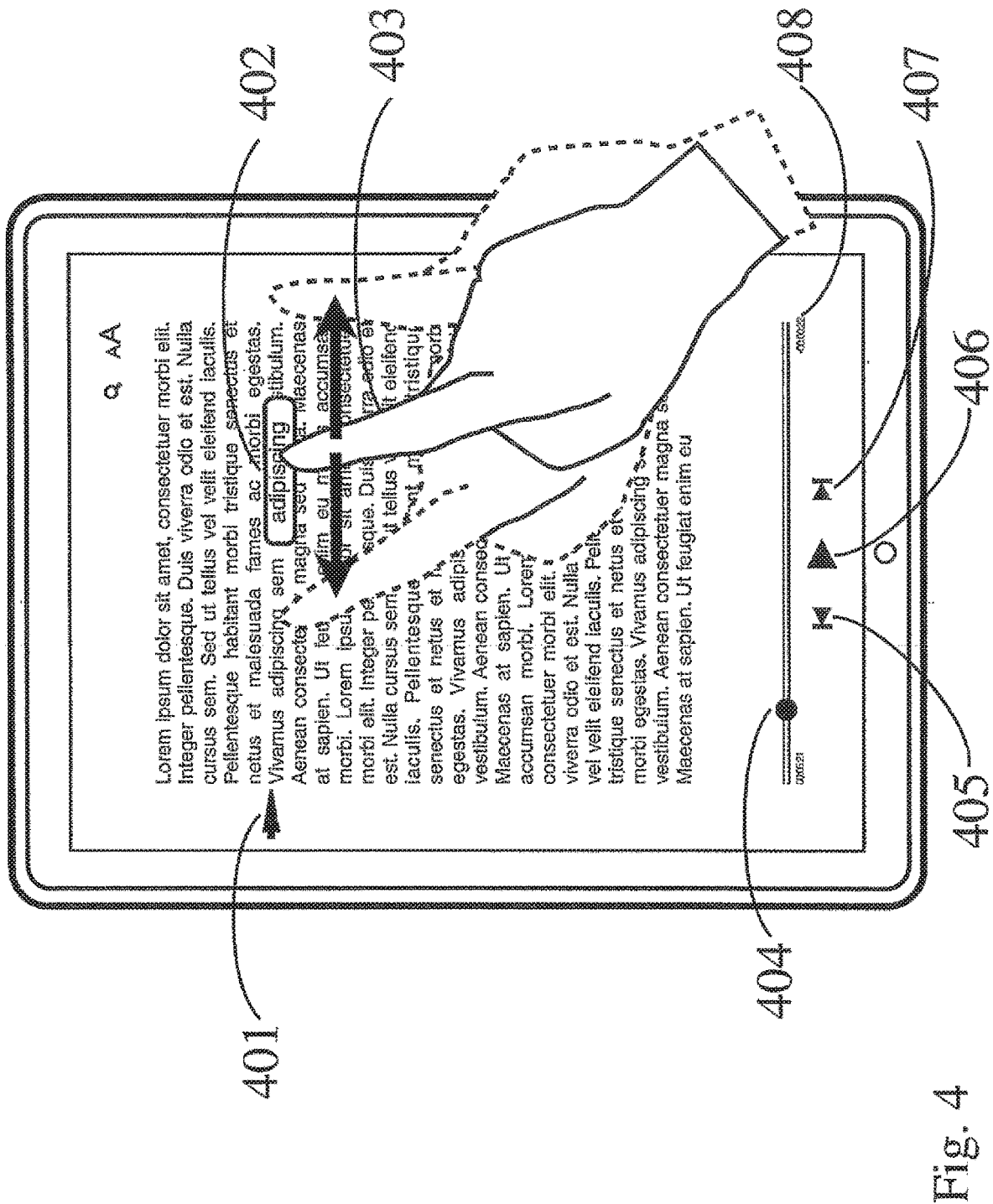
FIG. 4 is a screen layout of a text and associated controls in accordance with certain embodiments of the invention

FIG. 4 illustrates a user that interacts with the portrayed text indicator 402, in this case the portrayed magnifying glass. In one embodiment of the present invention the user may click, double click, drag, touch, multitouch, use a single touch or a multitouch gesture applied on the magnifying glass 402 in order to start playback of the TTS engine. In a preferred embodiment of the present invention in a computer connected to a mouse or similar apparatus the user shall use double click on the magnifying glass 402 in order to start playback of the TTS engine. In another preferred embodiment of the present invention in a computer connected to a mouse or similar apparatus the user shall use a single click on the magnifying glass 402 in order to stop playback of the TTS engine. In another embodiment of the present invention when a keyboard is connected the user may use the spacebar to toggle start and stop playback of the TTS engine. In yet another preferred embodiment of the present invention a device with a touch pad, touch screen, multi touch screen, or similar apparatus the user shall user a swipe gesture 403 in the direction of reading on the magnifying glass 402 in order to start playback of the TTS engine. For example, in English the user will use a swipe gesture from left to right applied on the magnifying glass 402 in order to start reading. In one embodiment of the present invention the user may click, double click, drag, touch, multitouch, use a single touch or a multitouch gesture applied on the magnifying glass 402 in order to stop playback of the TTS engine. In yet another preferred embodiment of the present invention a device with a touchpad, touch, multi touch screen or similar apparatus the user shall use a swipe gesture 403 opposite to the direction of reading on the magnifying glass 402 in order to stop playback of the TTS engine. For example in English the user will use a swipe gesture from right to left to stop reading. In another embodiment of the present invention when the user stops the playback of the TTS engine the magnifying glass r 402 places in the entire text will be saved in memory. When resuming reading by the TTS engine the TTS engine will resume playback from the saved position enabling precise resuming.

Figure 5A:
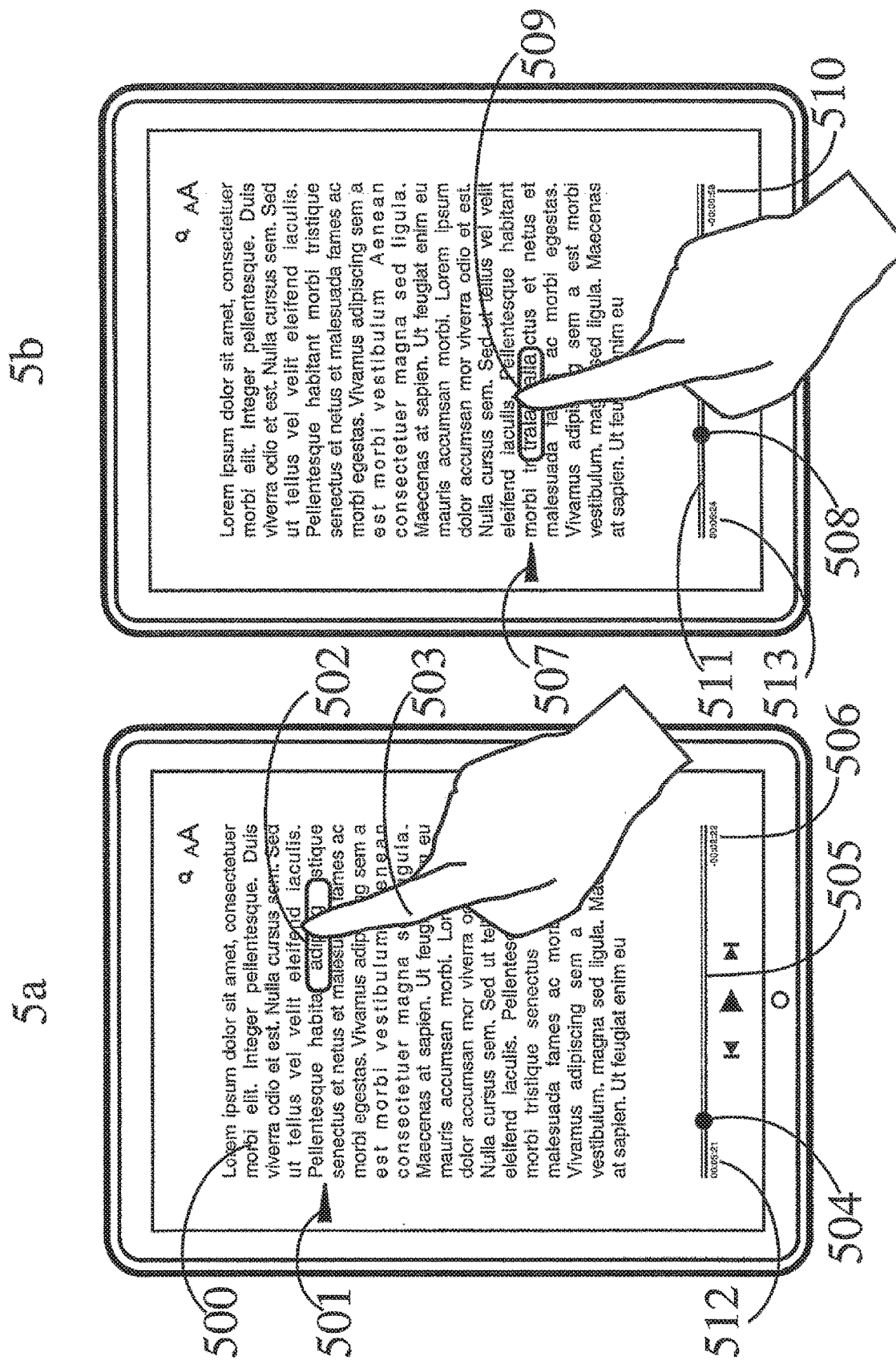

FIGS. 5a-b Illustrate a case where the user drags, uses a single touch or a multitouch drag gesture applied on the portrayed text indicator 502, in this case the portrayed magnifying glass, in order to set a new reading point for playback of the TTS engine. The new location the user set by the user maybe anywhere on the screen where the text 500 played by the TTS engine. In a preferred embodiment of the present invention in a computer connected to a mouse or similar apparatus the user shall use a dragging method on the magnifying glass 502 to set a new reading point for playback of the TTS engine. Dragging means pointing to the magnifying glass 502, pressing a mouse button down and moving the magnifying glass using the mouse to a new location 509 over the text 500 while the mouse button is being pressed. Releasing the mouse button means that dragging is completed. The magnifying glass 509 will be placed on new text setting a new reading point for playback of the TTS engine. When the magnifying glass 502 is dragged from one position placed on one line to a new position 509 placed on a different line, the line indicator 501 will also change its position pointing to the new line 507. In another embodiment of the present invention when the magnifying glass 502 is dragged from one position to a new position 509, the current time indicator 504 and the time elapsed 512 and time remaining 506 will also change their position and value respectively representing a new current time 508, and new time elapsed 513 and time remaining 510.

In yet another preferred embodiment of the present invention a device with a touch, multi touch screen or similar apparatus the user shall use a drag by touching the magnifying glass 502 and move it to a new location 509 on the text in order to set the current position for text to be read by the TTS engine. In another embodiment of the present invention when the user drag the text indicator 502 using his finger 503 to a new location 509 the magnifying glass 502 will follow the finger 503 while it is being drag to the new location 509. For example in English the user will use his finger 503 touching the magnifying glass 502 and then the user will drag his finger 503 over the touch screen to a new location 509 over the text. When the user is removing his finger from the screen (i.e not touching it) that will mean that dragging is completed. The magnifying glass 502 will be placed on the text setting a new reading 509 point for playback of the TTS engine.

Drag gesture may be double tap followed by a drag motion, or a single tap and hold followed by a drag motion.

Figure 6A:
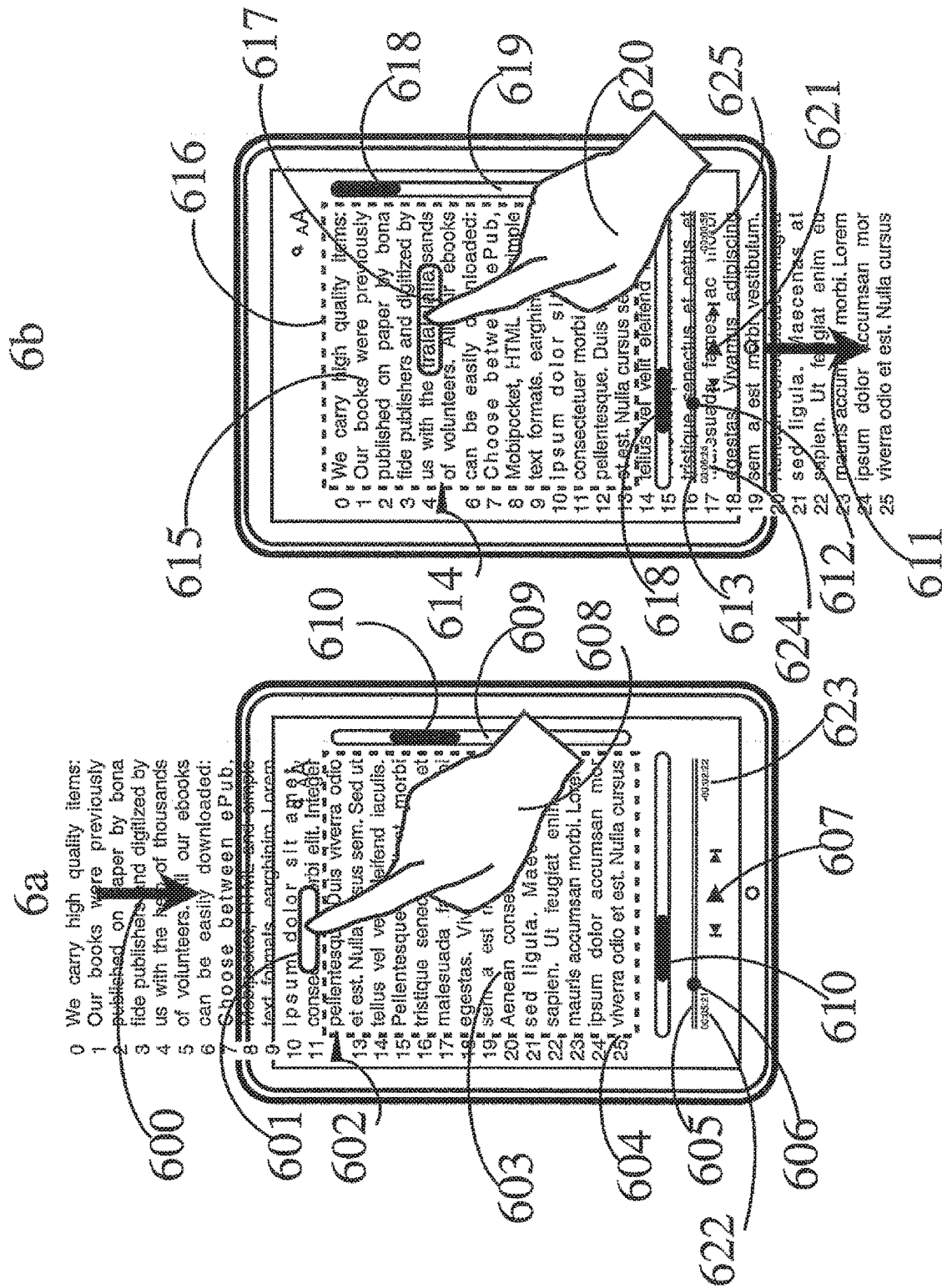
Figure 6C:
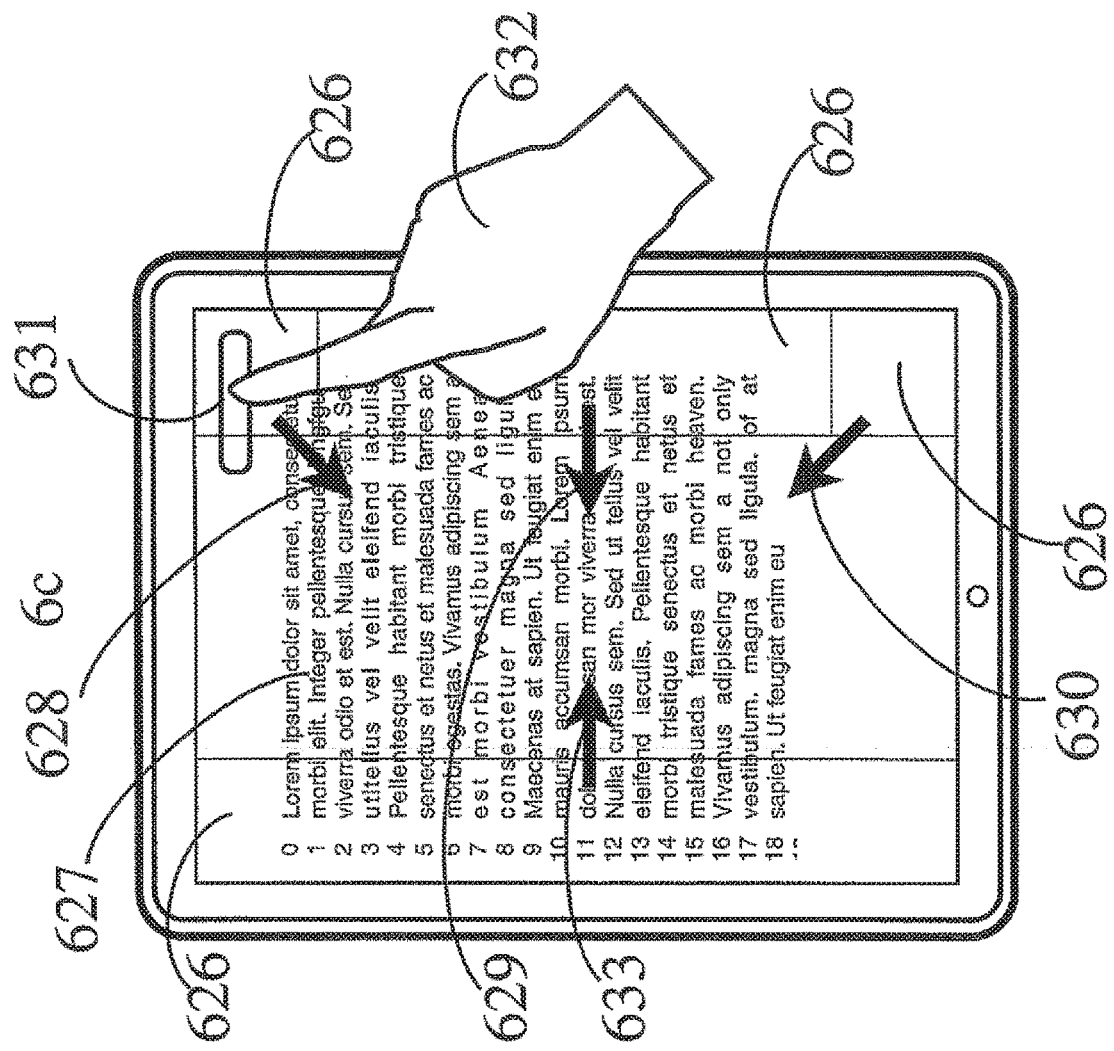

FIG. 6a FIG. 6b, and FIG. 6c illustrate a case were the user navigates through the text using a mouse dragging, touch, multitouch, a single touch, or a multitouch gesture applied on the portrayed text indicator 601, in this case the portrayed magnifying glass, in order to set a new reading point for playback of the TTS engine, where that playback point in the text 603 is not visible to the user at the time the users starts navigation. There are three methods illustrated in FIGS. 6a, 6b, and 6c.

FIG. 6a illustrates a case were the page can be scrolled to any direction 610. In one embodiment of the present invention the user navigates through the text 603 using mouse dragging, single touch dragging, or a multitouch dragging applied on the text indicator 601. When the mouse pointer, finger or fingers are dragged beyond the text area border 604, the text is scrolled, revealing new text 615 that was not visible at the time the user started the navigation. When the user releases the mouse button, finger, or fingers it signals that the dragging is completed. The text indicator 601 will be placed on new text 617, setting a new reading point for playback of the TTS engine.

In another embodiment of the present invention when the user drag the text indicator 601 using his finger 608, the magnifying glass 601 will follow the finger 608 while it is being dragged. When the magnifying glass 601 is dragged from one position placed on one line to a new position 617 placed on a different line, the line indicator portray 602 will also change its position pointing to the new line 614. In another embodiment of the present invention when the magnifying glass 601 is dragged from one position to a new position 617, the current time indicator 606 the time elapsed 622 and time remaining 623 will also change their position and value respectively representing a new current time 612, and new time elapsed 625 and time remaining 625.

In another embodiment of the present invention when the user drag the magnifying glass 601 using his finger 608, the magnifying glass 617 will follow the finger 620 while it is being dragged. When the magnifying glass 601 is dragged from one position placed on one line to a new position 617 placed on a different line, the line indicator portray 602 will also change its position pointing to the new line 614. In another embodiment of the present invention when the magnifying glass 601 is dragged from one position to a new position 617, the current time indicator 606 and the time elapsed 622 and time remaining 623 will also change their position and value respectively representing a new current time 612, and new time elapsed 624 and time remaining 625.

FIG. 6c, illustrates a case were the metaphor used for the text presentation is portrayed as a book, were the book is made of more than one page. The illustration shows page flipping areas 626. When these areas are clicked, double clicked, dragged, touched, multitouched, or applied with a single touch or a multitouch gesture the page will turn by portraying a page curl and turn over, using a multi frame animation to a different page, and the text 627 will change to a different text. In one embodiment of the present invention when the user 632 drags the magnifying glass 631 (using mouse dragging, single touch dragging, or a multi-touch dragging) over the page flipping areas the page 627 will turn by portraying a page curl and turn over, using a multi frame animation to a different page revealing new text 626 that was not visible at the time the user started the navigation. When the user 632 releases the mouse button, finger, or fingers it signals that the dragging is completed. The magnifying glass 631 will be placed on a new text, setting new reading point for playback of the TTS engine.

Figure 6D:
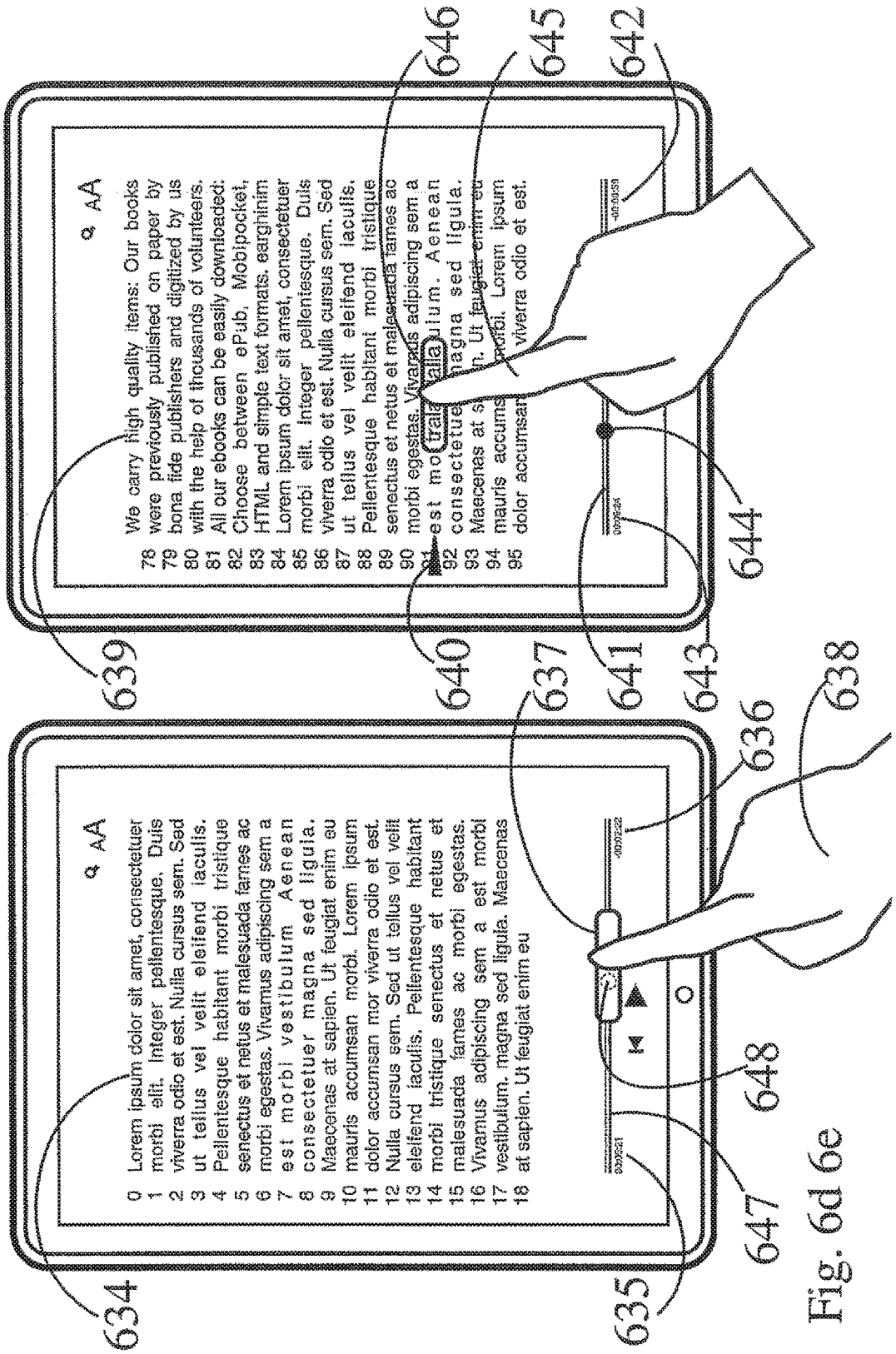

FIG. 6d and FIG. 6e, illustrate a case were the metaphor used for the text presentation is portrayed as a book, were the book is made of more than one page and a time line 647. When the current time indicator 648 is moved using mouse dragging, touch dragging, multitouched dragging, or applied with a single touch or a multitouch gesture the page 634 will change to a different page 639 revealing the text that should be displayed in the new point of time 646. In one embodiment of the present invention when the user 638 drags the portrayed text indicator, in this case the portrayed magnifying glass 637 (using mouse dragging, single touch dragging, multitouch dragging, or touchpad dragging) over the timeline area 647 the page 634 will change to a different page 639 revealing new text that was not visible at the time the user started dragging, when the user 645 is already in a different page 639 and releases the mouse button, finger, or fingers it signals that the dragging is completed. The magnifying glass 646 will be placed on a new text in the different page 639, setting new reading point for playback of the TTS engine.

Drag gesture may be double tap followed by a drag motion, or a single tap and hold followed by a drag motion.

Figure 7A:
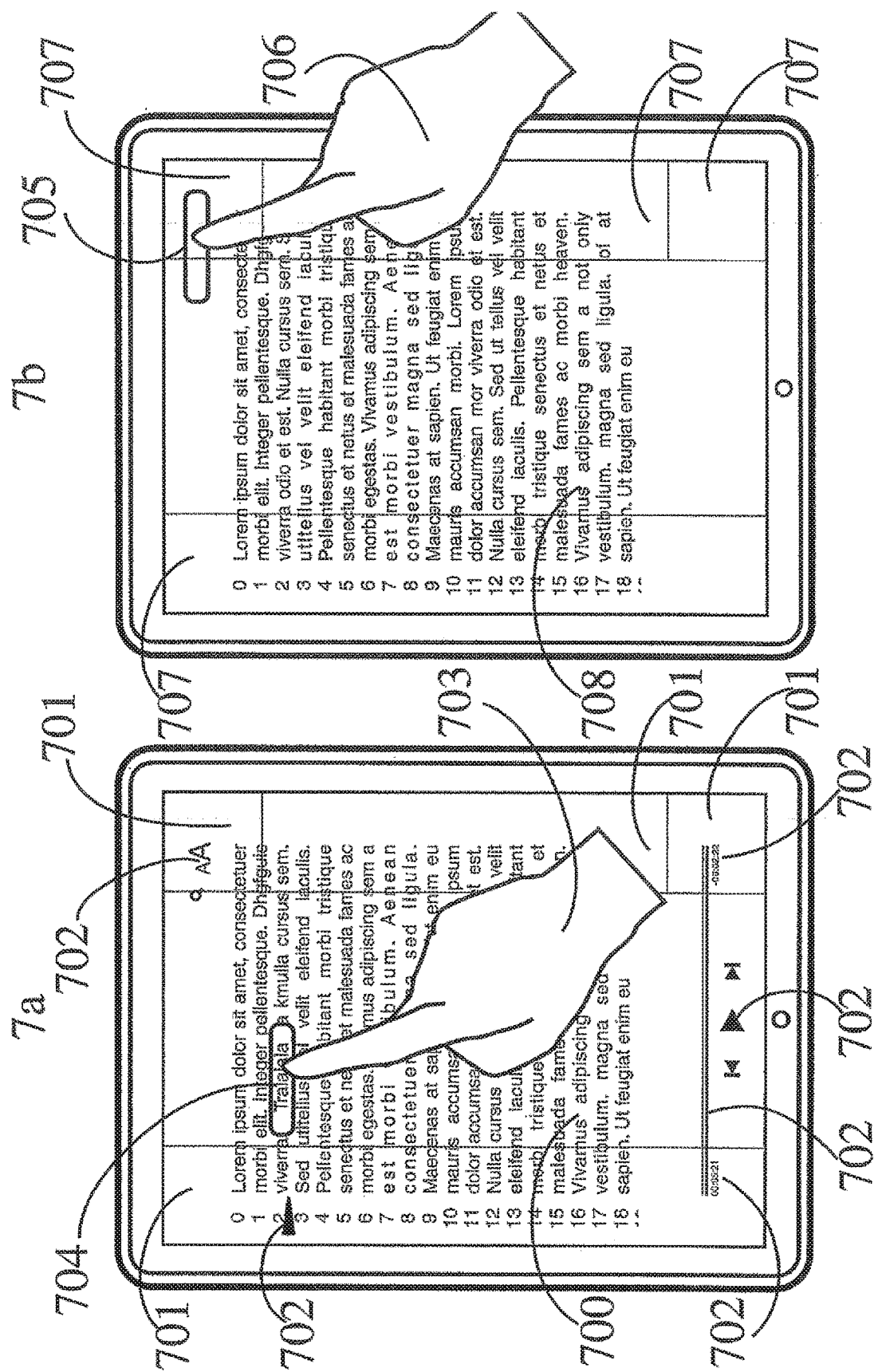

FIGS. 7a-b illustrates a case were the metaphor used for the text presentation is portrayed as a book, were the book is made of more than one page and may have a time line and other controls such as but not limited to play/stop button, skip forward backward buttons, line indicator in this case the portrayed triangle, text indicator in this case the portrayed magnifying glass, find controls, text size controls, and other navigation controls 702. In one embodiment of the present invention when the user click, double click, touch, multi-touch, or apply touch or multitouch gesture on the page flipping some or all of the controls 702 on the screen will disappear, an animation will occur and the controls that disappeared will reappear once the animation is done. In a preferred embodiment of the present invention when the user click, double click, touch, multitouch, or apply touch or multitouch gesture on the page flipping areas 702 some or all of the controls on the screen will disappear, a page flipping animation will occur and the controls that disappeared will reappear once the animation is done.

In some embodiments of the present invention (not shown in the figures) in a book format, when the TTS engine reads the last word of a page the page will turn to a different page and the TTS engine will continue reading from the first word in the new page. In case the text layout is in scrolling format, when the TTS engine reach the last word in the visible screen area or When the TTS engine nearly reach the last word of the visible screen area the text on the screen will scroll revealing new text to be read by the TTS engine and enable the user continuous reading. In some embodiments of the present invention when the TTS engine on stop mode and the user is scrolling the text or flipping to a new page a new reading point will be set automatically in a visible place in the text viewing area. In a preferred embodiment of the present invention when the TTS engine on stop mode and the user is scrolling the text or flipping to a new page a new reading point will be set automatically at the first word of the text that is currently visible in the text viewing area.

Figure 8:
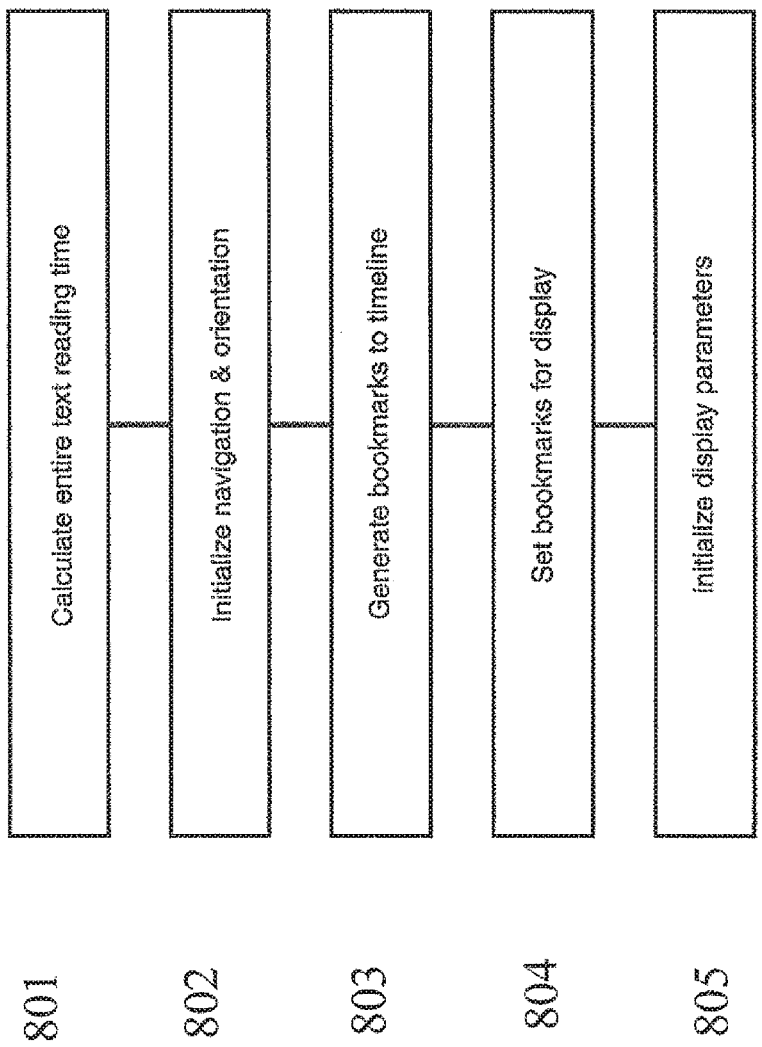
FIG. 8 illustrates a flow chart of a sequence of operations in a system in accordance with certain embodiments of the invention

FIG. 8. is a flow chart for initializing the Synchronization Unit 204, and Navigation and Orientation Unit 201. In 801 the system calculates the reading time it will take the TTS engine 200 to read through the text. The value of the total reading time will be presented in remaining time 221. The Navigation and Orientation unit is initialized 802 including display area, word, and line indicators. The time line is also initialized. If bookmarks are present they are rendered 803 for the timeline 217 representing the bookmarks associated with the entire text. If bookmarks are present they are also rendered 804 for the text presented in the display area 206. Other display parameters are initialized 805 for example elapsed time, current word, current line, font, font size, page number, search string, search results, etc. In one embodiment of the present invention calculating the entire text reading time 801 is done by multiplying the average time of reading a single character multiplied by the total number of characters of the entire text. In another embodiment of the present invention the average time of reading a single character is depended on the TTS engine reading speed. For example when TTS engine is set to read slow the average character reading time may be 90 ms and when the TTS engine is set to read the text fast the average charter reading time my be 40 ms.

Figure 9:
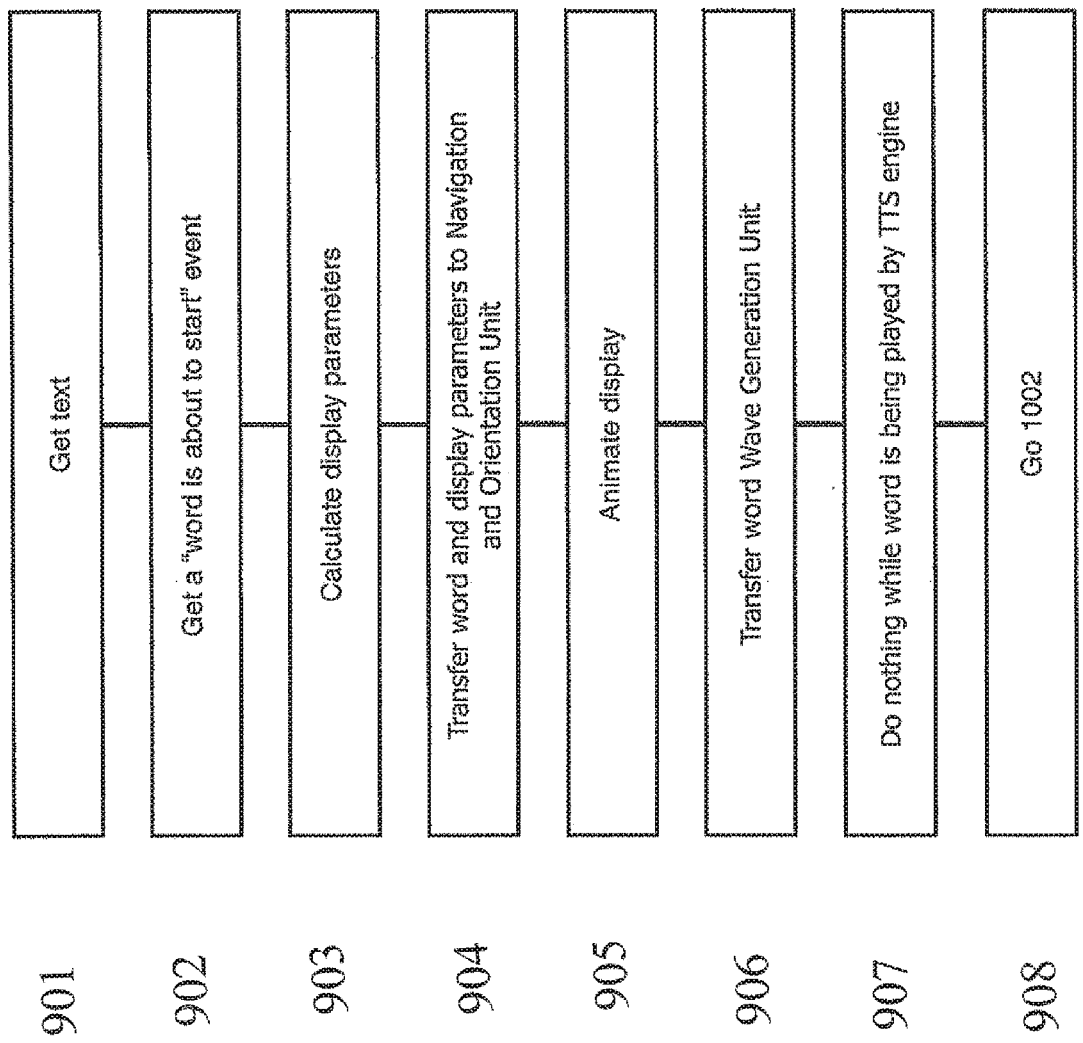
FIG. 9 illustrates a flow chart of a sequence of operations in a system in accordance with certain embodiments of the invention.

FIG. 9 is a flow chart showing an example of a Synchronization Unit process. 901 gets the text to be displayed and synchronized with the TTS engine 200. 902 gets "a word is about to start" event including the next word that should be displayed and synthesized by the TTS engine 200. 903 is calculating the display parameters for that word. Display parameters at least one of the following: 1) the word for highlighting in a line, 2) determining the location of the word in a line, 3) determining position of word in timeline. 904 is transferring the word and display parameters to be displayed by the Navigation and Orientation Unit 201. 905 Animating at least one of the following 1) the movement of the word indicator from the previous word to the next word 2) the movement of the line indicator to the following line 3) the current time knob over the time line to the new time representation of the next word. 906 transfer the word to the wave form generation unit 205 to start reading through the word. 907 the Synchronization Unit is waiting for the word to be played. By waiting for the word to be played the system achieves synchronization. 908 goes back to 1002, to get the next word that should be displayed and synchronized with the TTS engine 200. If 902 determines that there are no further words to be displayed and synchronize with the TTS engine 200, the process stops.

In a preferred embodiment of the present invention in order to achieve precise synchronization the animate display 905, will be completed first, and immediately after the word will be synthesized by the wave form generation unit 205.

Figure 10:
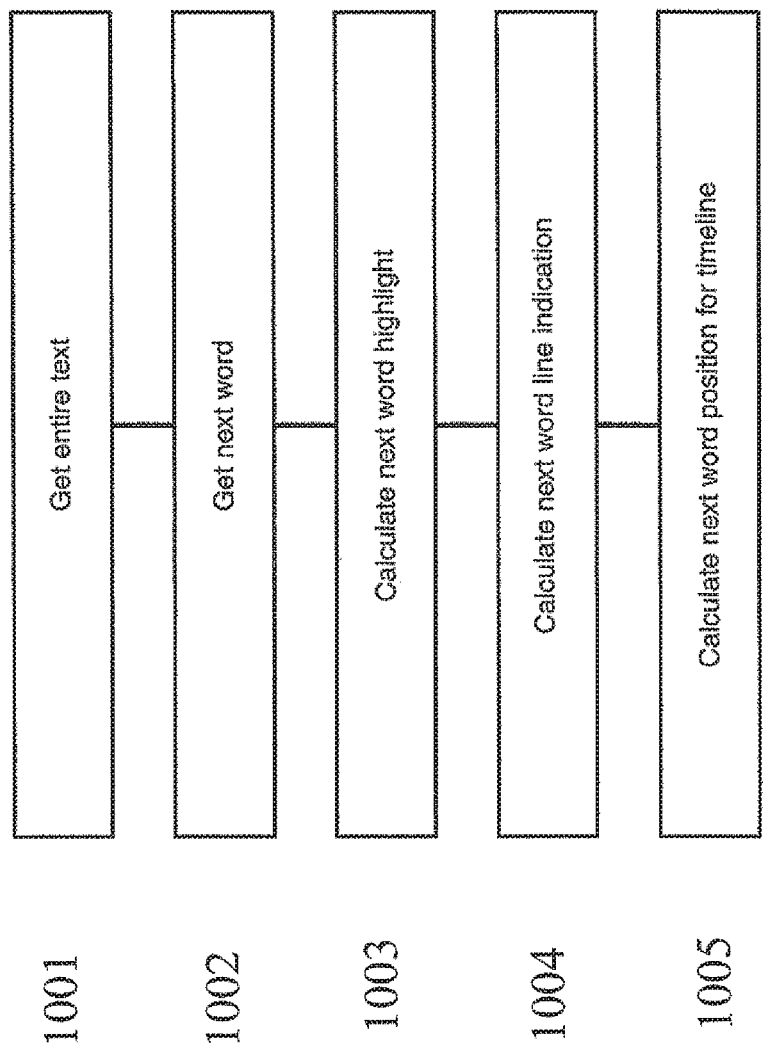
FIG. 10 illustrates a flow chart of a sequence of operations in a system in accordance with certain embodiments of the invention.

FIG. 10 is an example of a detailed flow chart of 903—Calculates display parameters for next word. 1001 obtains access to the entire text. 1002 determines the next word that needs to be displayed and synchronized with the TTS engine 200. 1003 is calculating the highlight of the next word. 1004 is determining if the word is in a new line and therefore the line indicator 208 should be updated for that word. 1005 calculates the respective point in time of that word in the entire reading sequence. The result of that calculation is used for determining the position of the knob 214 over the timeline 217 and for calculating and displaying the elapsed 220 and reaming remaining time 221.

In a preferred embodiment of the present invention Get next word 1002 will be triggered by a "word is about to start" event generated by the synchronization unit 204.

The present invention has been described with a certain degree of particularity, but those versed in the art will readily appreciate that various modifications and alterations may be carried out, without departing from the scope of the following Claims:

The invention claimed is:

1. A method for synchronizing speech output and display output of a text, said text being synthesized to the speech output, the method comprising:
   a. receiving a text portion of the text, wherein display of an entirety of said text portion requires at least two text areas;
   b. receiving a start event indicating a next text unit of said text portion to be displayed and synthesized, wherein the start event comprises moving a time indicator to a new position on a time line indicating a corresponding position of said next text unit in the text portion to be synthesized;
   c. in response to the new position in a time line, calculating display parameters associated with said next text unit, wherein said display parameters are designated to synchronize, on the basis of phonemes, the speech output and the display output of said next text unit, said display parameters including:
      1) a position of the next text unit in the text portion, and
      2) a position of the next text unit on a time line indicating a respective point in time of the next text unit in an entire playback time of the speech output of the text portion, wherein said entire playback time is calculated by multiplying an average time required to play back synthesized speech output of a single character by a number of total characters in the text portion;
   d. synchronizing, on the basis of phonemes, the speech output and the display output of the next text unit, including:
      displaying an indication of the next text unit according to said display parameters, executing a text to speech synthesis of the next text unit indicated by the new position on the time line, and outputting the speech output of the next text unit, said displaying including:
      i. portraying a text indicator indicating the position of the next text unit in the text portion, and
      ii. portraying said time indicator indicating the position of the next text unit on the time line; and
   e. repeating steps (c)-(d) with a subsequent text unit following the next text unit, the subsequent text unit becoming the next text unit of (c) upon repetition thereof.

2. The method according to claim 1, wherein the text unit is selected from a group comprising: a word, a character, a sentence, a line, a paragraph, a bookmark, and a page.

3. The method according to claim 1, wherein said average time required to play back synthesized speech output of a single character is configurable according to a desired text playback rate.

4. The method according to claim 1, wherein said text indicator includes a word indicator indicating a position of the next text unit for highlighting in a line.

5. The method according to claim 1, wherein said calculated display parameters further include
   3) elapsed time indicating a proportion of text that has already been processed compared to the entire playback time of the text portion, and
   4) remaining time indicating a proportion of text that has not been processed compared to the entire playback time of the text portion;
   and wherein said displaying further includes
   iii. portraying the elapsed time and the remaining time on a display.

6. The method according to claim 1, wherein step e further includes repeating steps c-d until a last word of said text portion being displayed and synthesized.

7. A method for synchronizing speech output and display output of a text, said text being synthesized to the speech output, the method comprising:
   a) providing a display of a time line indicating an entire playback time of the speech output of the text, wherein said entire playback time is calculated by multiplying an average time required to play back synthesized speech output of a single character by a number of total characters in the text;
   b) providing a display of a time indicator on the time line, wherein a position of the time indicator on the time line indicates a point in time within the entire playback time of the speech output of the text;
   c) synchronizing the display of a text unit within the text that is next to be synthesized to the speech output, constituting a next text unit, with the position of the time indicator on the time line such that changing the displayed next text unit will cause the time indicator to be moved to the point on the time line corresponding to the time of the speech output corresponding to that of the next text unit and changing the position of the time indicator on the time line will cause the displayed next text unit to be that which occurs at the indicated position on the time line;
   d) displaying a selected next text unit;
   e) feeding the selected next text unit to a text-to-speech engine and executing a text to speech synthesis of the selected next text unit, as indicated by the position of the time indicator on the time line, thereby generating a speech output of the next text unit;
   f) outputting said speech output, and g) repeating steps (d)-(f) with a subsequent text unit following the next text unit, the subsequent text unit becoming the selected next text unit of (d) upon repetition thereof.

8. The method of claim 7, wherein, in step (d), the next text unit that is displayed is set by moving the time indicator on the time line to a desired point in time for commencement of speech output.

9. The method according to claim 8, wherein said step (g) comprises repeating steps (d)-(f) until a last text unit of said text is displayed and synthesized to speech output.

10. The method according to claim 8, wherein the moving of the time indicator is accomplished by dragging the time indicator to a selected position on the time line.

11. The method of claim 7, wherein display of an entirety of said text requires at least two text areas.

12. The method according to claim 7, wherein the text unit is selected from the group consisting of a word, a character, a sentence, a line, a paragraph, a bookmark, and a page.

13. The method according to claim 7, wherein said average time required to play back synthesized speech output of a single character is configurable according to a desired text playback rate.

14. The method according to claim 7, wherein, in step (d), the indication of the position of the desired next text unit comprises highlighting the next text unit in a displayed text portion.

15. The method according to claim 7, further including displaying an elapsed time indicating a proportion of the entire playback time for the text that has already been processed compared to the entire playback time of the text, and remaining time indicating a proportion of entire playback time for the text that has not been processed compared to the entire playback time of the text.

16. The method according to claim 7, wherein the repetition of step (d) with the new selected next text is accompanied by an animated progressive movement of at least the time indicator on the time line from the last text unit output to speech to the selected next text unit.

17. The method according to claim 7, wherein, said step (d) further includes displaying a line indicator indicating a position of the line where the selected next text unit resides.

* * * * *